US012772930B2

(12) United States Patent
Waldo et al.

(10) Patent No.: US 12,772,930 B2
(45) Date of Patent: Oct. 27, 2026

(54) AUTOMATED VIRTUAL LOAD TRACKING

(71) Applicant: Deere & Company, Moline, IL (US)

(72) Inventors: Michael A. Waldo, Ankeny, IA (US); Grant J. Wonderlich, Milan, IL (US)

(73) Assignee: Deere & Company, Moline, IL (US)

( * ) Notice: Subject to any disclaimer, the term of this patent is extended or adjusted under 35 U.S.C. 154(b) by 554 days.

(21) Appl. No.: 17/969,259

(22) Filed: Oct. 19, 2022

(65) Prior Publication Data

US 2024/0130282 A1 Apr. 25, 2024
US 2024/0224859 A9 Jul. 11, 2024

(51) Int. Cl.

| | |
|---|---|
| ***A01D 41/127*** | (2006.01) |
| ***G06Q 10/08*** | (2024.01) |
| ***G06Q 50/02*** | (2012.01) |
| ***G07C 5/00*** | (2006.01) |
| ***G07C 5/08*** | (2006.01) |
| ***H04W 4/40*** | (2018.01) |

(52) U.S. Cl.
CPC ..... *A01D 41/1275* (2013.01); *A01D 41/1272* (2013.01); *G06Q 50/02* (2013.01); *G07C 5/008* (2013.01); *G07C 5/0816* (2013.01); *H04W 4/40* (2018.02)

(58) Field of Classification Search
CPC ............ A01D 41/1275; A01D 41/1272; A01D 41/127; H04W 4/40; G06Q 50/02; G06Q 10/08; G07C 5/008; G07C 5/0816; G07C 5/00; G07C 5/08
See application file for complete search history.

(56) References Cited

U.S. PATENT DOCUMENTS 7,257,503 B1 8/2007 Anderson et al.
7,761,334 B2 7/2010 Pickett et al.
2006/0190494 A1* 8/2006 Beck ...................... G06Q 10/06
(Continued)

FOREIGN PATENT DOCUMENTS

DE 102011120402 A1 * 6/2013 ........... A01D 43/086
EP 3643160 A1 4/2020
(Continued)

OTHER PUBLICATIONS

Machine Translation of Foreign Patent Publication DE102011120402A1—Belser et al. (Year: 2011).*
(Continued)

*Primary Examiner* — Scott A Browne
*Assistant Examiner* — Rami Nabih Bedewi
(74) *Attorney, Agent, or Firm* — Tucker Ellis LLP; Michael G. Craig

(57) ABSTRACT

One or more techniques and/or systems are disclosed for automating the collection aggregation, and processing of data relating to harvesting or dispersion of an agricultural product. During harvesting and planting operations, data related to the product harvested or planted can be collected, aggregated, and used to improve the operation, and to help identification of the product at point of sale or point of dispersion. Further, certain operations can be automated during the harvesting or planting, such as automatic deployment of a field cart to offload/load product from/to the agricultural vehicle in the field. Additionally, load data can be automatically collected, aggregated, and identified, to follow the product through all stages.

22 Claims, 13 Drawing Sheets

(56) References Cited

U.S. PATENT DOCUMENTS

| | | | | |
|---|---|---|---|---|
| 2010/0070145 | A1 | 3/2010 | Foster et al. | |
| 2013/0045067 | A1 | 2/2013 | Pickett et al. | |
| 2014/0193234 | A1 | 7/2014 | Kormann | |
| 2014/0277961 | A1* | 9/2014 | Blank | G05B 13/0275 701/1 |
| 2015/0023767 | A1 | 1/2015 | Affleck | |
| 2019/0176621 | A1 | 6/2019 | Cardona | |
| 2020/0128726 | A1* | 4/2020 | Takeda | G01C 21/005 |
| 2020/0196526 | A1* | 6/2020 | Koch | A01D 41/127 |
| 2020/0319655 | A1* | 10/2020 | Desai | A01B 69/008 |
| 2021/0195840 | A1 | 7/2021 | Puryk et al. | |
| 2021/0219493 | A1 | 7/2021 | Meier et al. | |
| 2021/0294337 | A1 | 9/2021 | Van Mill et al. | |
| 2022/0050437 | A1 | 2/2022 | Currier | |

FOREIGN PATENT DOCUMENTS

| | | | | |
|---|---|---|---|---|
| EP | 3671590 | A1 | 6/2020 | |
| JP | 2006081490 | A * | 3/2006 | A01D 69/00 |
| WO | 2018112615 | A1 | 6/2018 | |
| WO | WO 2019091535 | A1 | 5/2019 | |
| WO | 2020038810 | A1 | 2/2020 | |
| WO | WO 2022061447 | A1 | 3/2022 | |

OTHER PUBLICATIONS

Machine Translation of Foreign Reference: JP 2006081490 A—Keita et al. (Year: 2004).*

Machine Translation of Foreign Reference: DE 10 2011120402—Belser et al. (Year: 2011).*

Extended European Search Report and Written Opinion issued in European Patent Application No. 23201901.8, dated Feb. 27, 2024, in 11 pages.

Extended European Search Report and Written Opinion issued in European Patent Application No. 23201902.6, dated Feb. 26, 2024, in 08 pages.

Non-Final Office Action for U.S. Appl. No. 17/969,833, dated Nov. 6, 2025, 54 pages.

* cited by examiner

AUTOMATED VIRTUAL LOAD TRACKING

BACKGROUND

In an agricultural setting, product is moved into and out from a field using a combination of vehicles and equipment. Harvesters, such as combines, gather and collect target products from the field, and off-load the collected, harvested product to carts or trailers periodically during harvesting. Filled carts can subsequently be used to haul the product to a target storage facility, or off-load to a larger trailer that takes a collection of the carted product to the storage location. Further, some products may be dispersed in the field, such as chemical treatments, fertilizer, seeds, etc. Carts may be used to load product to a target piece of equipment, such as a seeder, to periodically refill the inventory stored on board.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. that can operably couple wit One or more techniques and systems are described herein for to improve logistics, speed up operation, and provide more accurate information for the product and operation. As an example, during harvesting, data related to the harvested product can be collected in the field, and a filed cart can be automatically deployed during operation to the harvester for offloading product. When it is detected that the cart is aligned with the harvester, offloading can automatically commence at least until the product is offloaded. Data related to the product can be linked with the cart, and follow the product through on-road hauling, drying, storage and point of sale. In this way, the data can be aggregated and appropriately identified for each product sold.

In one implementation of a method for automatic load tracking and logistics for agricultural-related products, during operation of an agricultural vehicle, real-time data can be collected. The real-time data can indicate a location of the agricultural vehicle over time, and an amount of product disposed in a storage container in the agricultural vehicle over time. In this implementation, upon automatic determination that the amount of product disposed in the vehicle storage container has reached a first predetermined level, an alert can be activated that indicates deployment of a mobile product transport container to the agricultural vehicle. Further, upon automatic detection that the mobile product transport container has reached a product loading position with regard to the agricultural vehicle, a loading procedure can be automatically activated between the agricultural vehicle and the mobile product transport container. Additionally, upon automatic detection of the amount of product disposed in the vehicle storage container reaching a second predetermined level, the loading procedure between the agricultural vehicle and the mobile product transport container can be automatically deactivated.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
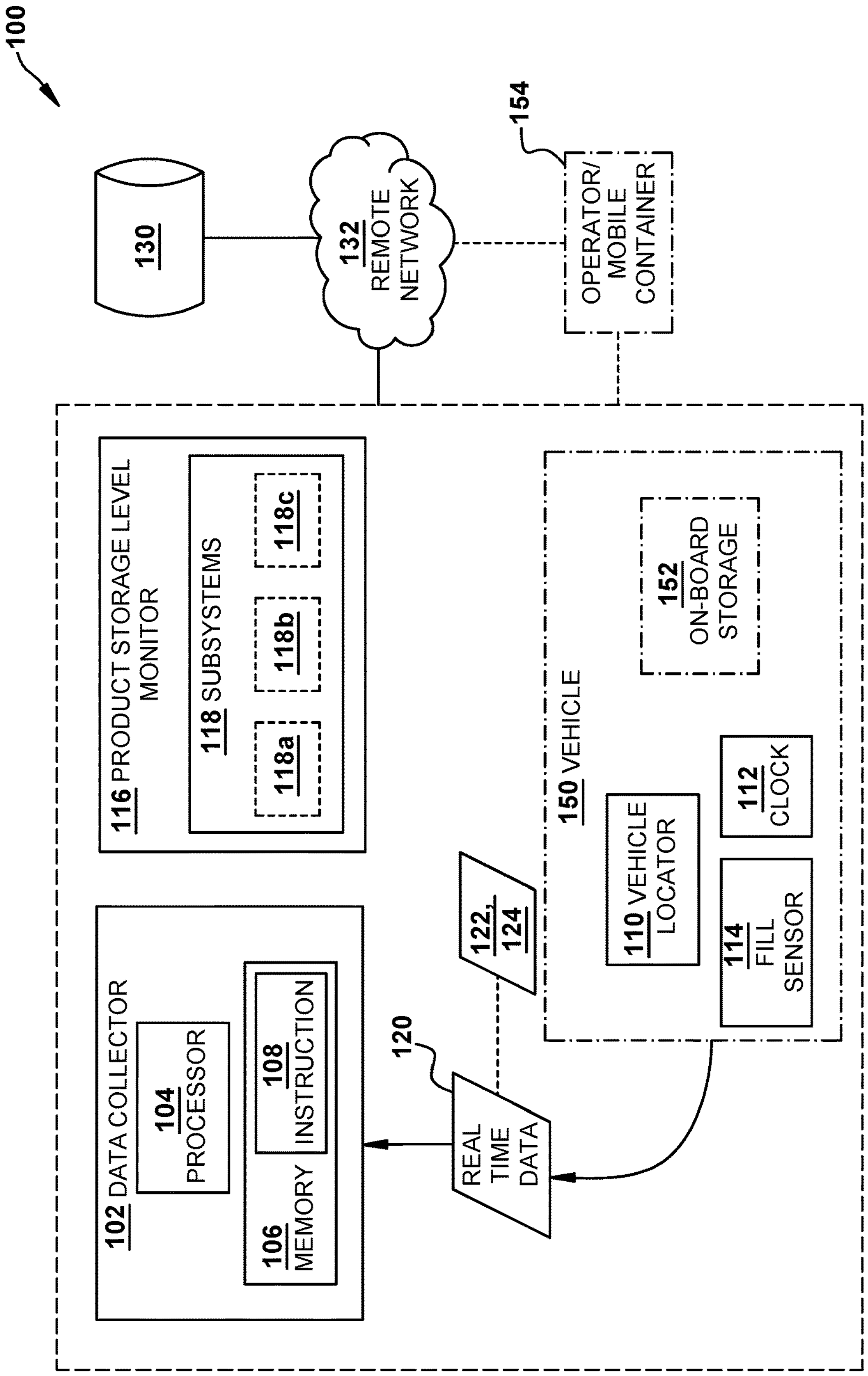
FIG. 1 is a schematic diagram illustrating an example system for automatic identification and load tracking of products being transferred in-field during operations.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As described herein, a system can be devised that provides for an automatic identification and load tracking of grain or other products being transferred in-field during operations; and automatic collection and transfer of data associated with the target product. In one aspect, the system can be used to support any and all load tracking, in field product segregation decisions by operators, and automatic retrieval of scale data (e.g., weight) to support post calibration and processing of harvest data from target vehicle (e.g., harvesters, combines, etc., where product is off-loaded from the field). Further, the system may also be used with other types of in-field operations that utilize tendering of chemicals, fertilizer, and seed (e.g., loading to the field-based vehicle). The example, systems can provide information to support in-field decisions by Tractor/Cart operators and Truck/Trailer operators. For example, loads can be segregated by measured product (e.g., grain or other commodity) attribute, such as moisture content, quality of the product, protein amount, oil content, product damage (e.g., cracked kernel) occurrence, length of cut (e.g., for forage) or other measurable crop properties. Further, the information gathered can be automatically used for after the fact traceability to particular fields, and locations. For example, as data is collected during various events for a target product, the data can be transferred and follow the product to its final destination. As an example, this may reduce or eliminate manual entry of load-related information, and load attributes for tracking and logistics of a target product, such as from field to storage In some implementation, in this aspect, the system can utilize Global Position System (GPS) data for location, along with time data, for a fleet of vehicles or product transfer containers utilized in a harvesting or planting (e.g., fertilizing, treating, etc.) operation, and the data the vehicles collect. As an example, the data can include signals that indicate when unloading or loading begins and ends during the course of operation. Further, as an example, metadata that has been previously identified/stored for characteristics of the equipment/vehicle can contain certain machine offsets (e.g., location/position offsets from/to the vehicle or equipment) to a specified point, such as the end of the unloading auger on a combine, and/or a pre-defined area of the top of a product transfer container (e.g., Grain Cart or Trailer) that is appropriate to accept grain (e.g., where the unloading auger can be positioned while unloading).

Additionally, in some implementations, the data can be collected at regular intervals (e.g., or continually) and curated into a remote operations center, and loaded to a database with spatial and temporal indexing capabilities. As one example, the data may be analyzed as it is collected for unload begin and end signals, and then, in combination with the location and time information, and the data records, determine which product transport container (e.g., grain cart or trailer) was positioned at a location at that time given known equipment dimensions and characteristics. In this example, once a match is identified, a "Virtual Load" record may be created or extended for the equipment receiving the load that contains pre-determined load metrics and characteristics, such as weight, volume, load time, condition of the product, and much more. As an example, this collection and curation of the data can be done automatically based on the load signals, location, and time match without need for operator intervention. Further, if the target transport container, such as a cart, already contains one or more portions of another load at the time of collection, the load quality information for all of the contained, partially filled loads can be aggregated together as appropriate for the circumstances.

FIG. 1 is a schematic diagram that illustrates one example implementation of a system 100 that can be used to automate load tracking and logistics for agricultural-related products. In this implementation, the system 100 can comprise a data collection module 102, which, during operation of an agricultural vehicle 150 collects real-time data 120. The real-time data 120 can be indicative of a location of the agricultural vehicle 150 over time, and an amount of product disposed in a storage container 152 in the agricultural vehicle 150 over time. That is, for example, the data collection module 102 can comprise a computer processor 104 and memory 106, where instructions 108 for collecting and processing data are stored in the memory 106, and processed by the processor 104.

As one example, a location sensor 110, such as a global positioning system (GPS) module, can be used to collect position data for the vehicle 150, and a local or remote clock 112 can be used to collect time (e.g., or the time may be identified from a wireless network that provides such data). The GPS data and time data can be used to determine the location, the heading, and/or the speed of the agricultural vehicle 150. For example, a fill sensor 114 (e.g., weight sensor, optical sensor, radar, density, fill-rate, or the like) can detect the amount of a product in the vehicle's storage container 152 (e.g., harvester product tank, seeder tank, fertilizer tank, etc.) to detect how much product is in the storage tank at various intervals, or continually. The amount of the product in the tank 152 over time can be used to determine a fill rate for the tank 152, or collection/dispersion rate. This data can be collected and processed by the data collection module 102. Further, for example, the collected data and/or the processed data can be stored locally in memory 106 and/or in remote storage 130 connected by a wireless network 132.

Returning to FIG. 1, the example system 100 can comprise a product storage level monitoring component 116. The product storage level monitoring component 116 can comprise a sensor that detects a level of product disposed in the storage container 152 of the agricultural vehicle 150. In this implementation, upon the sensor detecting that the amount of product disposed in the storage container 152 of the vehicle has reached a first pre-determined level 122, the product storage level monitoring component 116 can activate one or more subsystems 118.

For example, upon detecting that the product has reached the first pre-determined level 122 (e.g., in the on-board strange container 152), an alert 118*a* can be activated that indicates deployment of a mobile product transport container 154 (e.g., mobile storage transport) to the agricultural vehicle 150. That is, in one example, if the product in the vehicle storage tank 152 is a harvested product (e.g., grain, or other target product harvested from a farm field) the first pre-determined level 122 may be a high level that indicates the tank 152 needs to be emptied or offloaded. In this example, the alert 118*a* can indicate to an operator that they need to deploy the mobile storage transport 154 (e.g., grain cart) to the agricultural vehicle 150 to collect the offloaded product. In this way, for example, the mobile storage transport 154 can be deployed in time to collect the product from the agricultural vehicle 150 before the on-vehicle storage container 152 is completely full. In this way, the deployment of the mobile storage transport 154 can be appropriately timed to meet the agricultural vehicle 150 in the field while still operating (e.g., harvesting or dispersing) to mitigate down time. That is, for example, the first pre-determined level 122 can be selected such that the deployment of the mobile storage transport 154 meets the timing needs of the agricultural vehicle 150.

In another implementation, the first pre-determined level 122 may comprise a low level, such as when the agricultural vehicle 150 is dispersing the product from the on-board container 152 to a target field. That is, for example, a seeder vehicle may comprise an on-board container in which seed is stored and deployed from, into the field. In this example, the first pre-determined level 122 can indicate that a mobile storage transport 154 with seed on-board is deployed to reload the vehicle container 152 with more seed. As before, the first pre-determined level 122 can be selected such that seed deployment may be continued while the mobile storage transport 154 is deployed for reloading in the field.

Returning to FIG. 1, in the example system 100, upon automatic detection of the mobile product transport container 154 reaching a product loading position with regard to the agricultural vehicle 150, the product storage level monitoring component 116 can automatically activate a loading procedure 118*b* between the agricultural vehicle 150 and the mobile product transport container 154. That is, for example, an operator of the mobile storage transport 154 (e.g., a cart coupled with a tractor or other powered vehicle, or self-propelled cart) direct the mobile product transport container 154 to the agricultural vehicle 150, which is in operation in the field, to a position that allows for an appropriate loading operation (e.g., loading into the vehicle storage 152 from the mobile storage transport 154, or off-loading from the vehicle storage 152 to the mobile storage 154) to take place.

A variety of technology and methods may be used to automatically detect that the mobile storage transport 154 is in an appropriate position for a loading operation with the operating vehicle 150. For example, a proximity beacon can be disposed on the vehicle 150 and/or the mobile storage transport 154 that can automatically detect when the mobile storage transport 154 in in an appropriate loading position, such as by wireless contact between the units. As another example, a camera (e.g., or other optical scanner) can be disposed on the agricultural vehicle 150 to detect when the transport container 154 has arrived at the appropriate loading location. Further, in some implementations, the optical scanner or camera can identify an ID badge, such as a scannable code (e.g., QR code, barcode, other scannable code) that identifies or is associated with the mobile storage transport 154. In this way, for example, characteristics associated with the mobile storage transport 154, such as capacity, type, product already stored, etc. As another example, vehicle position data may be provided, such as GPS, for both the vehicle 150 and mobile storage transport 154, to identify when they are proximate and/or in position for a loading operation.

As described above, when it is automatically detected that the mobile product transport container 154 has reached the product loading position proximate the agricultural vehicle 150, the product storage level monitoring component 116 automatically activates a loading procedure **118*b* between the agricultural vehicle 150 and the mobile product transport container 154. That is, for example, the agricultural vehicle 150 may automatically activate an offloading procedure of the product from the on-board storage 152 to the mobile storage transport 154, when the mobile storage transport 154 is detected. As another example, the mobile storage transport 154 may automatically activate a vehicle loading procedure of the product from the mobile storage transport 154 to the vehicle's container 152, when the mobile storage transport 154 is detected. Alternately, an alert can be automatically provided to the vehicle's operator when the mobile storage transport 154 is in place, who may manually active the loading procedure. Additionally, in some implementations, upon activation of the loading procedure, data associated with the target product (e.g., product condition, type, etc.) can be transferred to, and/or associated with the mobile product transport container 154**, in a remote database. In this way, for example, the information about the target product can travel (e.g., in a database) with the target product as it moves through a processing cycle (e.g., from field to storage).

Returning to FIG. 1, in the example system 100, upon automatic detection of the amount of product disposed in a storage container reaching a second predetermined level 124, the product storage level monitoring component 116 can automatically deactivate the loading procedure **118*c* between the agricultural vehicle 150 and the mobile product transport container 154. In some implementations, the second predetermined level 124 can comprise a lower level, such as a level that indicates that the on-board vehicle container 152 is substantially emptied (e.g., offloading product to the mobile storage transport 154). In other implementations, the second predetermined level 124 can comprise an upper or higher level, such as a level that indicates that the on-board vehicle container 152 is substantially full (e.g., loading product from the mobile storage transport 154). In these examples, once the second predetermined level is detected, the vehicle 150 can and/or the mobile storage transport 154** deactivate the loading procedure.

Figure 2A:
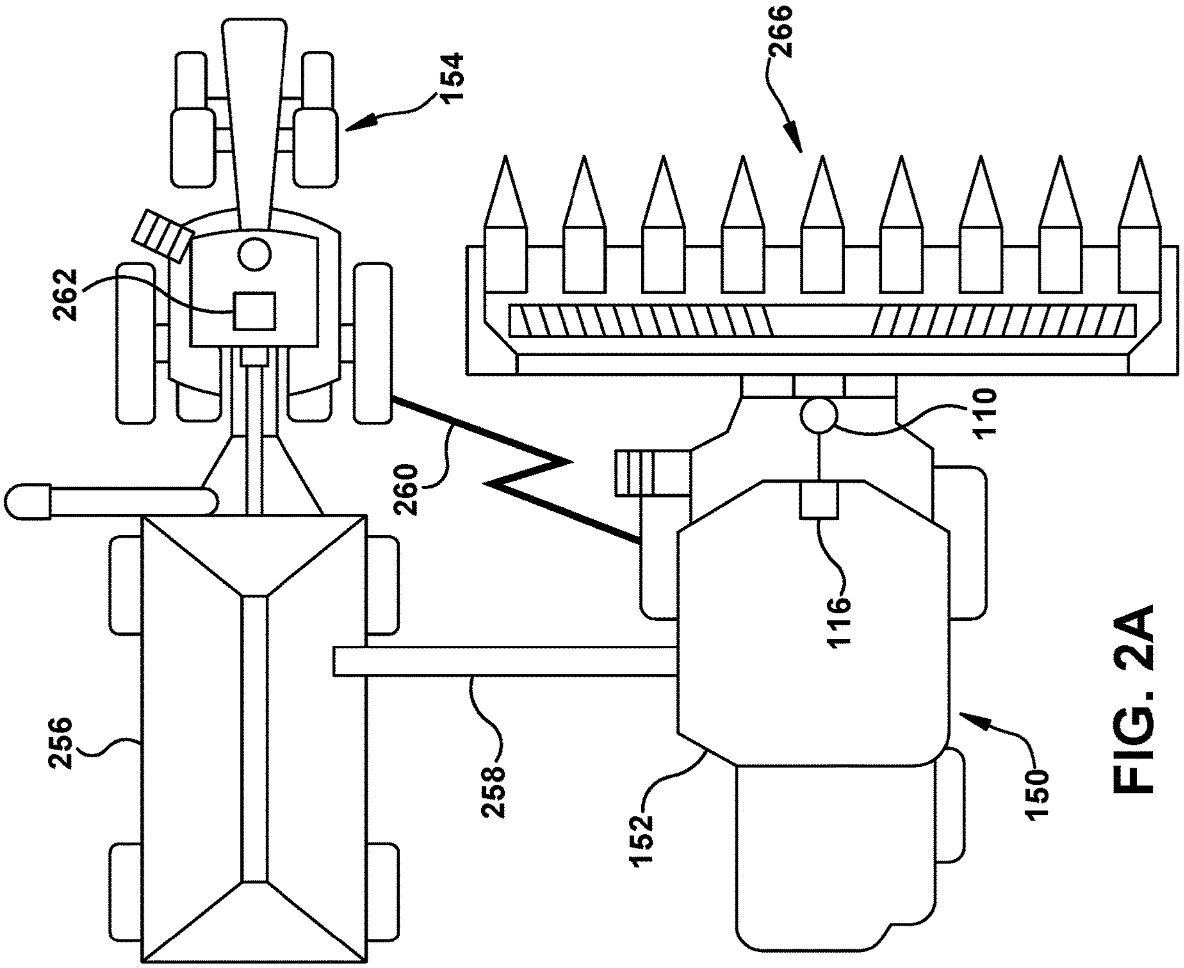
FIGS. 2A and 2B are component diagrams illustrating example implementations of one or more portions of systems as described herein.
Figure 2B:
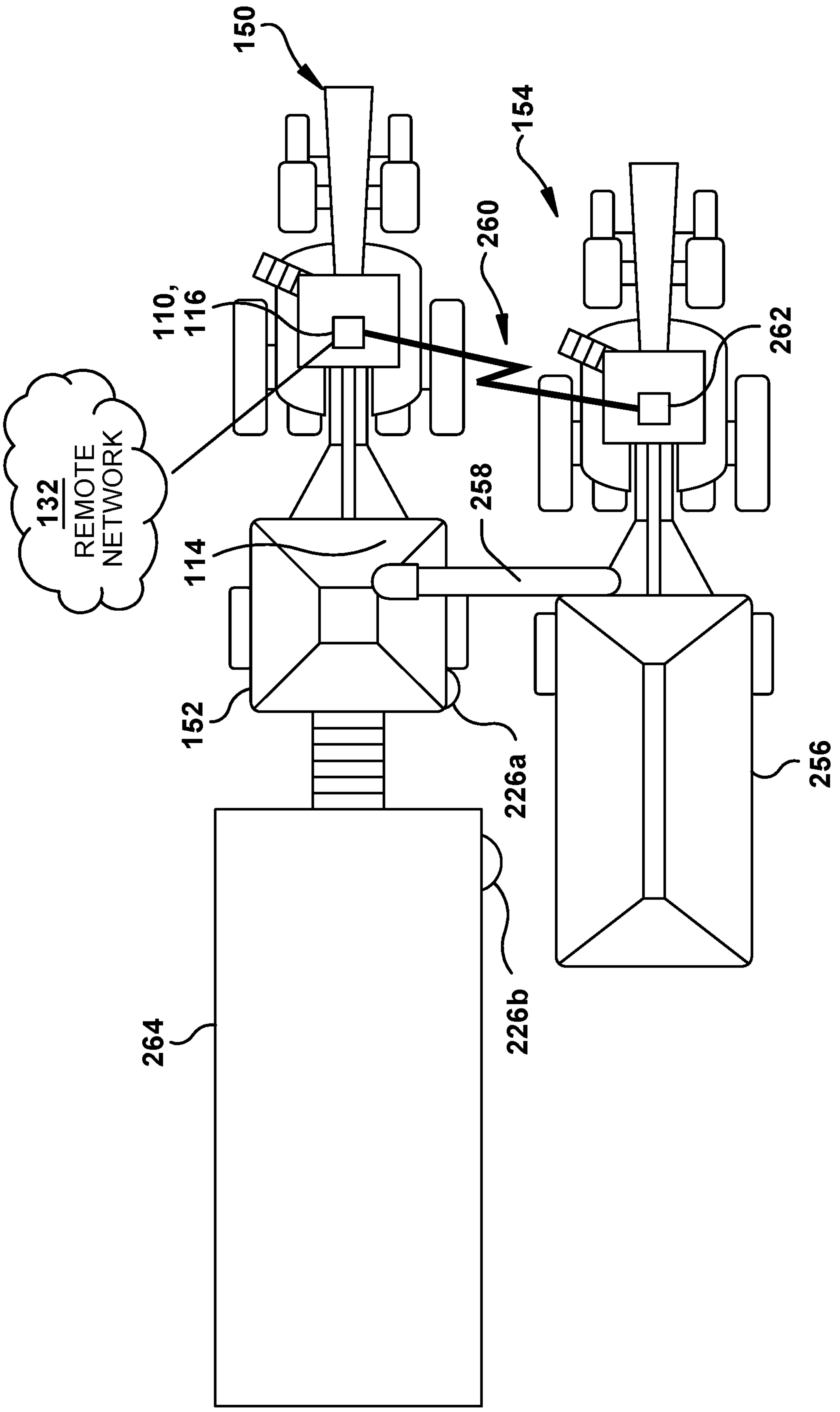

As an illustrative example, with continued reference to FIG. 1, FIGS. 2A and 2B are component diagrams that illustrate two example implementations of the system 100 described herein. In these examples, an agricultural vehicle 154 is positioned proximate a mobile storage transport 154, which comprises a mobile container 256 to move product to/from the vehicle 150. As an example, the mobile storage transport 154, and/or operator therein, may have received an alert at an on-board alerter/communication device 262 (e.g., or on a separate computer of mobile computing device) that indicates the need for a loading procedure (e.g., on-loading, off-loading to/from the agricultural vehicle 150). Upon receiving the alert notification **118*a* an operator can deploy the mobile storage transport 154 to the location of the agricultural vehicle 150, such as while it is still in operation. In some implementations, a mobile transport position sensor 226 (e.g., on the agricultural vehicle 150, or mobile storage transport 154) can detect when the mobile storage transport 154 is in position for the loading procedure, as depicted in FIGS. 2A and 2**B.

In this example, in some implementations, a local area network connection 260 may be formed between the agricultural vehicle 150 and the mobile storage transport 154, or a network can be formed between them using a remote wireless network 132. In this way, information regarding the characteristics of the product (e.g., amount, such as weight or volume, type of product, condition, location of product collection, measured product attributes, such as moisture content, quality of the product, protein amount, oil content, product damage (e.g., cracked kernel) occurrence, length of cut (e.g., for forage) or other measurable crop properties, etc.), along with position of the vehicles, characteristics of the loading procedure (e.g., begin, end, in process), and other information can be shared. Further, upon detecting the appropriate position of the mobile storage transport 154 with regard to the agricultural vehicle 150, a product transfer device 258 can be deployed to begin the loading procedure **118*b***.

In this example, the fill sensor 114 can detect when the product has reached the pre-determined level (e.g., second level 124, either full or empty depending on the loading procedure). When the pre-determined level is reach, the loading operation de-activation operation **118*c* can be activated, thereby ending the loading procedure between the vehicles 150, 154. In these examples, the agricultural vehicle 150 can comprise a harvester 266 that collects products (e.g., grain or other agricultural goods) from the field, stores them locally in the agricultural vehicle storage container 152, then offloads them to the mobile container 256 of the mobile storage transport 154. As another example, the agricultural vehicle 150 can comprise a product dispersion component 264, such as a seeder, fertilizer, etc., that disperses products (e.g., seeds, agricultural chemicals, etc.) to the field, from the local vehicle storage container 152, then can be reloaded from the mobile container 256 of the mobile storage transport 154**.

In one aspect, operators pick up loads of harvested product from the harvesters in the field, such as using field carts pulled by a tractor. Often, the loads are subsequently transported to another location, such as the edge of a field, and loaded into a separate, larger trailer (e.g., truck trailer) for transport from the farm, such as to a static storage location (e.g., silo). Often, harvesting is stopped while the harvester offloads the product. The systems described herein can not only be used to aggregate and track appropriate product information, but to help align the field cart with the harvester during continued harvesting, and collect information about the offloading process and resulting product.

Figure 3A:
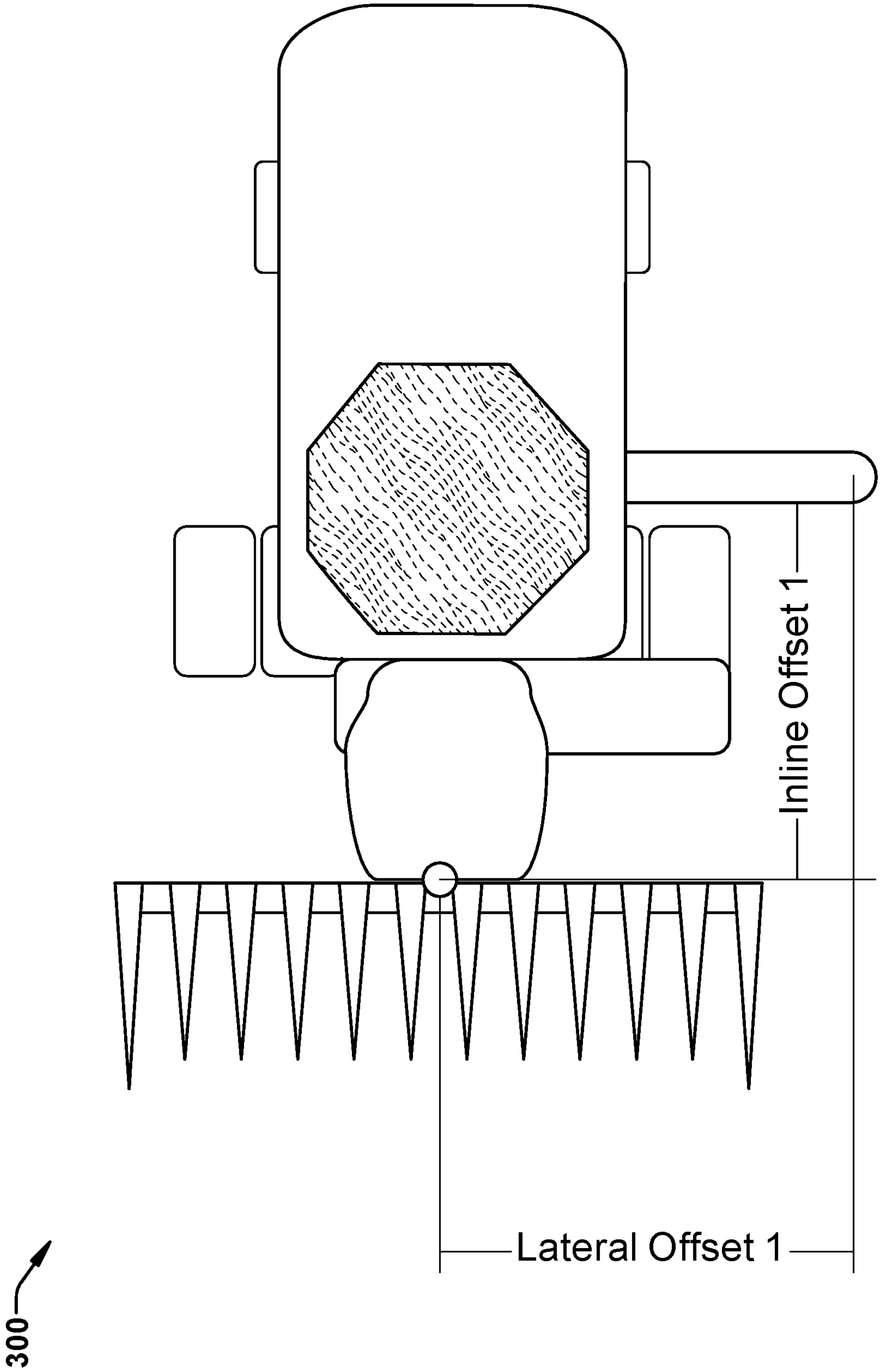
FIGS. 3A and 3B are component diagrams illustrating example implementations of one or more portions of systems as described herein.
Figure 3B:
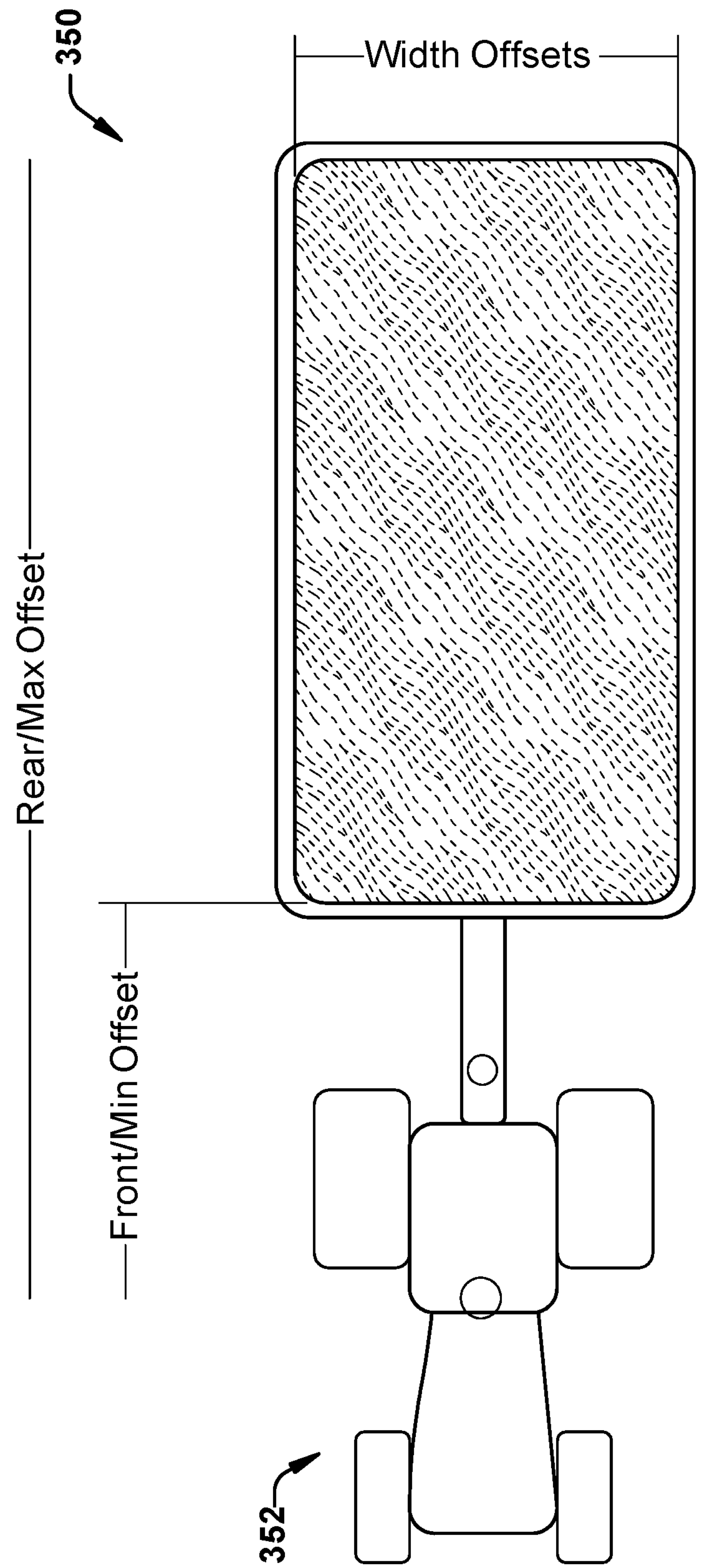

As one example, as illustrated in FIGS. 3A and 3B, which are component diagrams illustrating an example agricultural vehicle 300 (e.g., combine harvester), and an example field cart 350, that is towed by a tractor 352. As illustrated, the dimensions of the harvester 300 and cart 350 can be identified for the purpose of appropriate site matching for the unloading of the harvested product. That is, a virtual loading window (e.g., for unloading grain) can be created that is positioned proximate the harvester 300 during a planned offloading, where the virtual loading window is sized and positioned to accommodate the cart 350 during offloading.

Figure 4A:
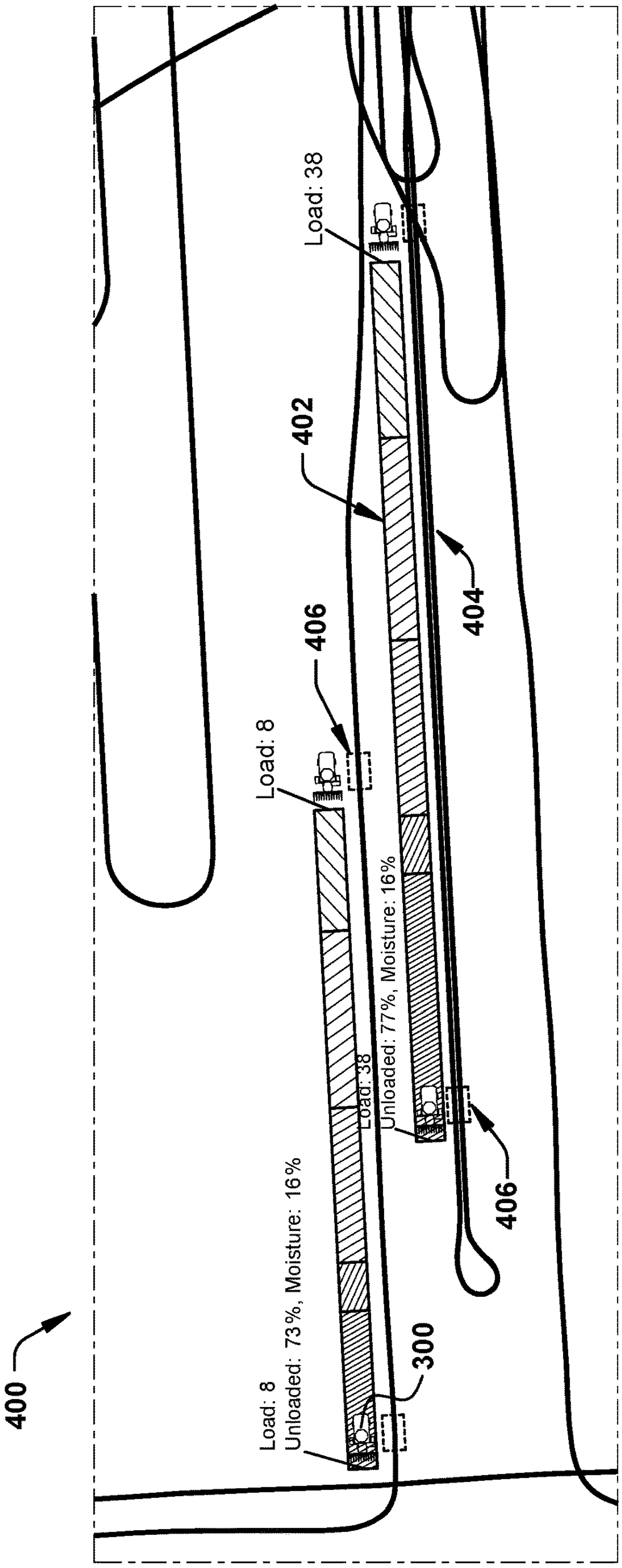
FIGS. 4A and 4B are computer generated images illustrating example implementations of one or more portions of systems and methods as described herein.
Figure 4B:
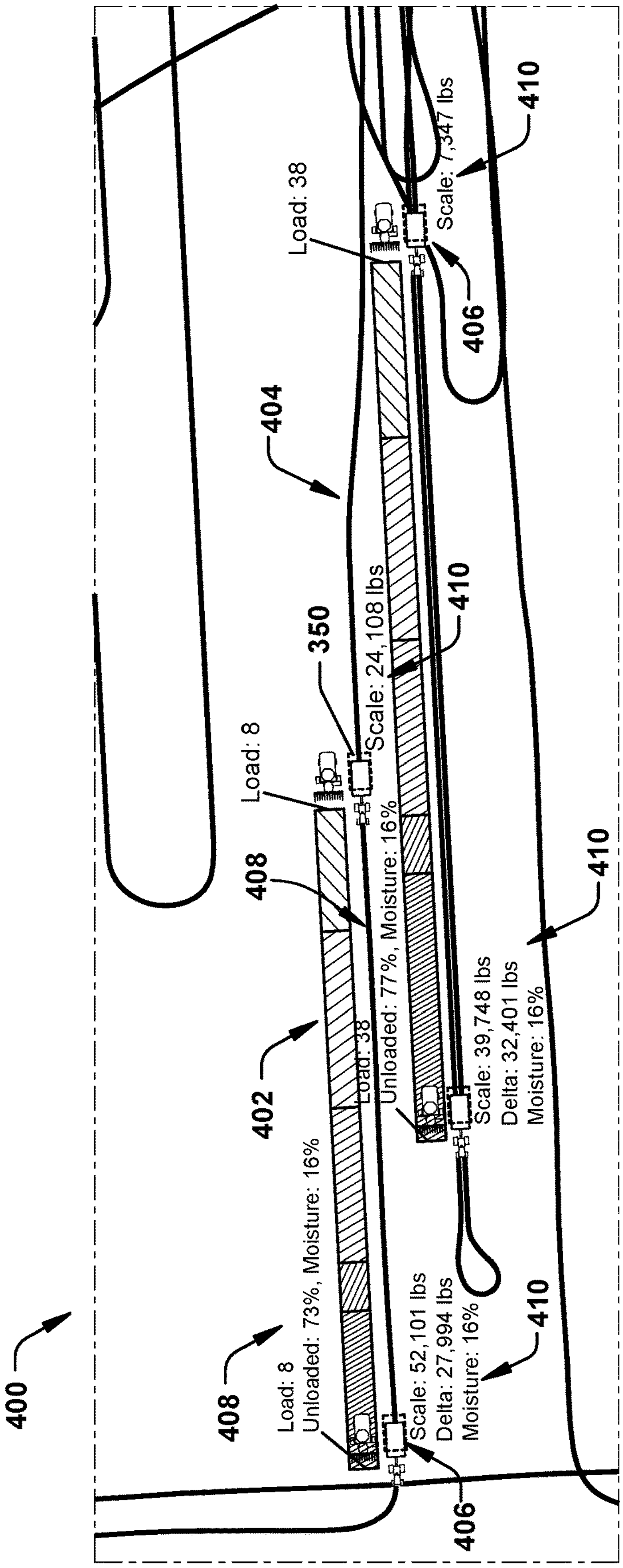

FIGS. 4A and 4B illustrate example virtual views 400 showing paths 402, 404 taken by the harvester 300 and cart 350 during a loading operation. As illustrated, the harvester 300 can continue along its pre-planned path 402 and continue to harvest during the loading operation. The virtual loading window 406 is shown in the virtual view 400 proximate to the harvester. The virtual loading window 406 is positioned and sized to allow the cart 350 to pull alongside the harvester 300 into an appropriate position for offloading product. As one example, when the cart 350 is positioned within the virtual loading window 406, a scanner or camera (e.g., 226*a, b*) disposed on the harvester 300 may scan or image the cart to identify the specific cart. Alternately, when the cart 350 is positioned within the virtual loading window 406, a local wireless connection (e.g., 260) may be arranged between the harvester 300 and cart 350, whereby information about the cart 350 can be identified, and information about the harvested product that is offloaded from the harvester 350 can be identified. That is, for example, if the offloading device (e.g., auger, such as the product transfer device 258) is within the virtual loading window 406 at a time when the cart 350 is within the window, an algorithm can be activated that begins offloading (e.g., 118*b*).

As an example, as illustrated, harvester stored product information/harvester load metrics 408, such as moisture content of the product, amount unloaded from on-board storage, etc., can be uploaded to the logistics system. Additionally, mobile storage product information/cart load metrics 410, such as weight, moisture, amount of change on-board, etc., can be uploaded to the logistics system. As an example, the logistics system can have a database of stored information (e.g., 130) stored using a remote network, such as cloud storage and processing (e.g., 132), In this way for example, the harvester stored product information/harvester load metrics 408 can be linked to the mobile storage product information/cart load metrics 410 in the database, and used to aggregate the data for logistics according to a desired use. For example, instead of manual documentation of the type, location, moisture content, time, and other characteristics of the harvested product, the information can be collected automatically and may be linked to specific harvesters, carts, and other transports. In this way, when transported for sale or storage the automatically collected and aggregated information can be easily linked to the product. As one example, once the tractor/cart 350 is identified, its data can be used to verify unloaded quantity. Harvester load metrics 408 can be assigned to cart load metrics 410 automatically for aggregation, tracking and in-field decision making. This can be automatic and can be done in the cloud with the presence of both harvester and cart/tractor data streams.

Figure 5A:
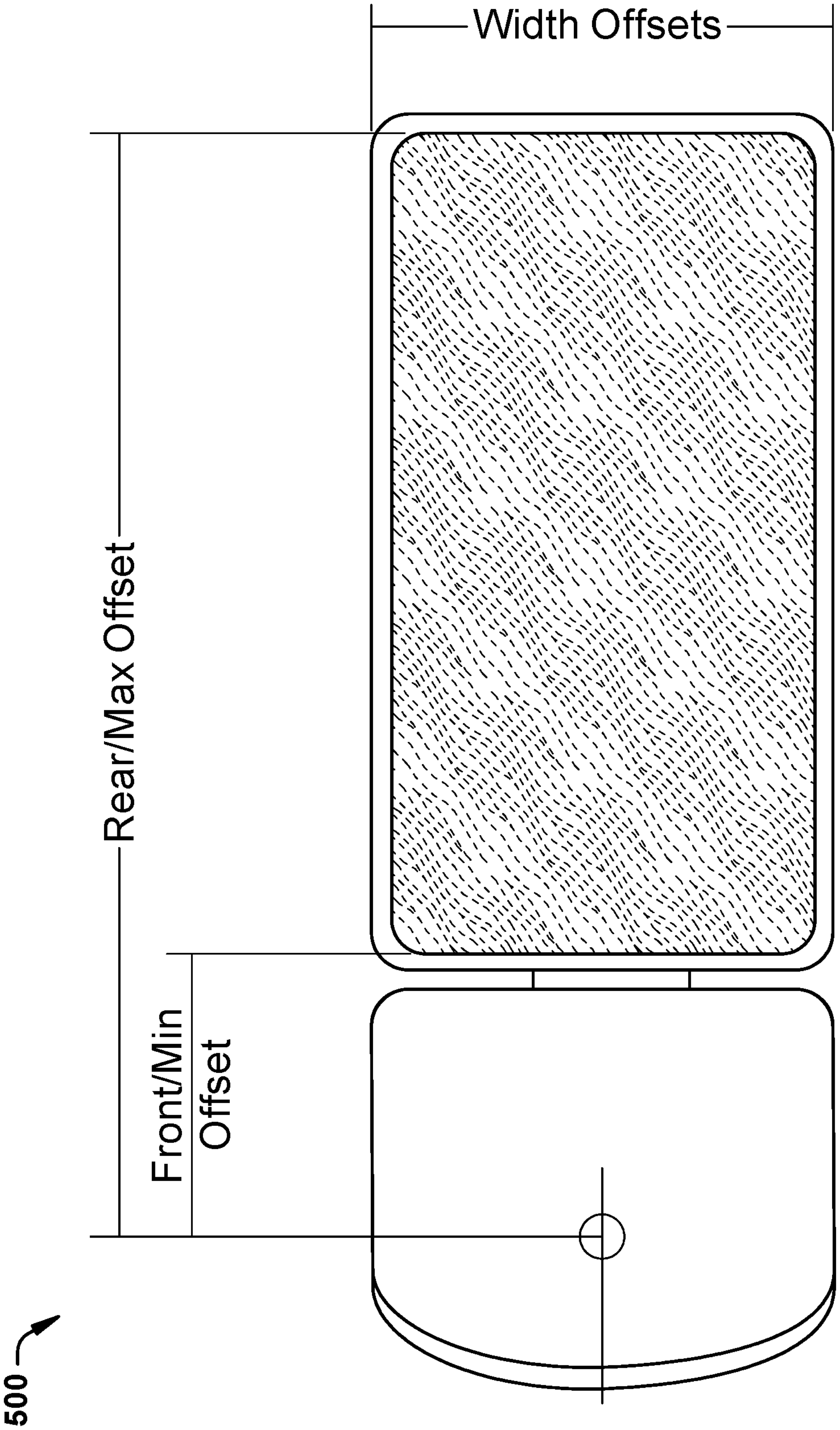
FIGS. 5A and 5B are component diagrams illustrating example implementations of one or more portions of systems as described herein.
Figure 5B:
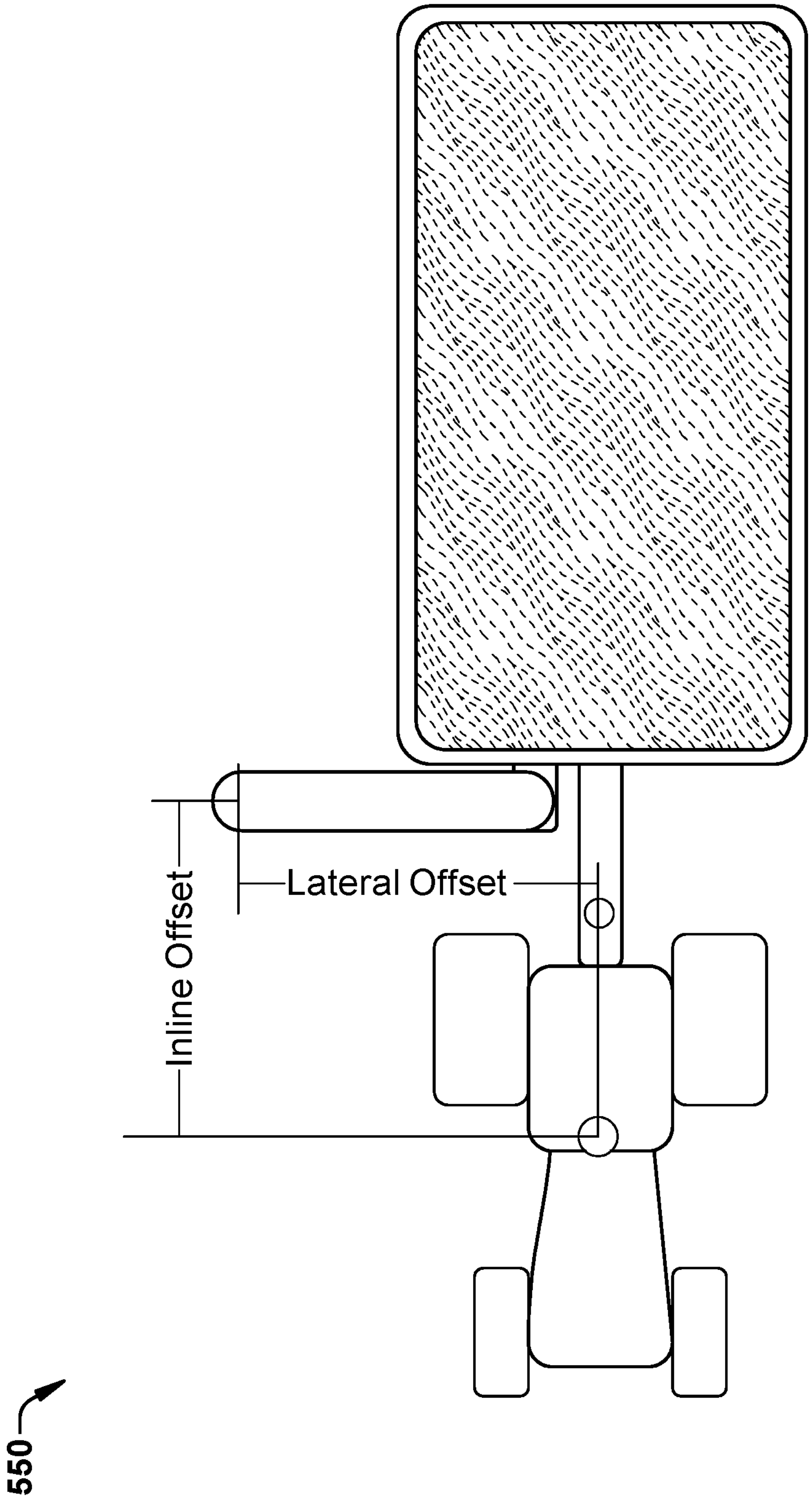

As illustrated in FIGS. 5A and 5B, showing an example trailer/container's target 500 extents, and a grain cart's extents with auger spout 550. For example, the grain cart 550 (e.g., mobile storage transport 154) can collect grain from the harvesters in operation, and transport the grain to a waiting truck trailer/container 500, where it is aggregated with other grain from the fields. Much like the offloading from the harvester to the cart descried above, the grain can be offloaded from the cart 550 to the truck trailer/container 500. In some implementations, another virtual loading window (e.g., 406) can be associated with the truck trailer/container; and when the cart 550 is positioned within that window the offloading can begin, and the data from the cart can be aggregated with data for the truck/trailer container 500. For example, load information can be aggregated automatically from harvester to cart, and cart to trailer. This information can be used to assist operators in destination for loads, such as for storage, drying, or ready for selling.

As one example, then the loading operation is activated 118*b* (e.g., offloading) several actions can be triggered. The status or state of the product transfer device 258 (e.g., auger) is identified (e.g., extended—yes/no, operating—yes/no, transfer rate, etc.), and can be placed into the appropriate condition. Further, the status of the power take off (PTO) can be identified and activated if needed to run the auger. In some implementations, a detector can be positioned to detect the status of the product transfer device 258, such as the rate, condition, etc., and/or whether the product is being offloaded from the auger, such as by using a camera or other scanner. Additionally, a detector can be used to identify the flow rate of the offloaded product, such as using a scanner (e.g., optical) or the like. Power consumption can be monitored to detect a change in state, which may help identify loading characteristics, such as loading rate, activation/deactivation, etc., such as by monitoring electrical current, hydraulic flow rate, speeds, and/or shaft torques of drive shafts. In some implementations, the operator of the vehicle can activate/deactivate based on sensed conditions, or the processes can begin/end automatically. As illustrated above, the change in weight of the respective vehicles can be monitored to detect amount and rate of flow; and/or a change in the level or height of the vehicle can be monitored to detect amount or flow rate.

FIGS. 6A, 6B, 7A, and 7B are schematic diagrams that illustrate a process flow of information for the logistics scheduler system 600 as described herein. In the past, weight or amount of product data was not automatically available, and was typically written down or entered manually. Further, there was no easy way to track which carts receive product from which harvesters, or where, or what the characteristics of the product are that are transferred. As described herein, the Harvester (e.g., or planter, etc.) can communicate with the field cart, and with the trailer, etc., locally through local wireless networking and/or remotely thorough a remote wireless network (e.g., Internet, Cloud). In some implementations, load tracking and data aggregation can occur in the cloud, using databases and data aggregation systems (e.g., programs) to identify where, when, what, etc. for the products comping from the field and going to the field. Additional data can be aggregated including grain dryer status, grain elevator weights, elevator wait times, bin capacities, and more.

Figure 6A:
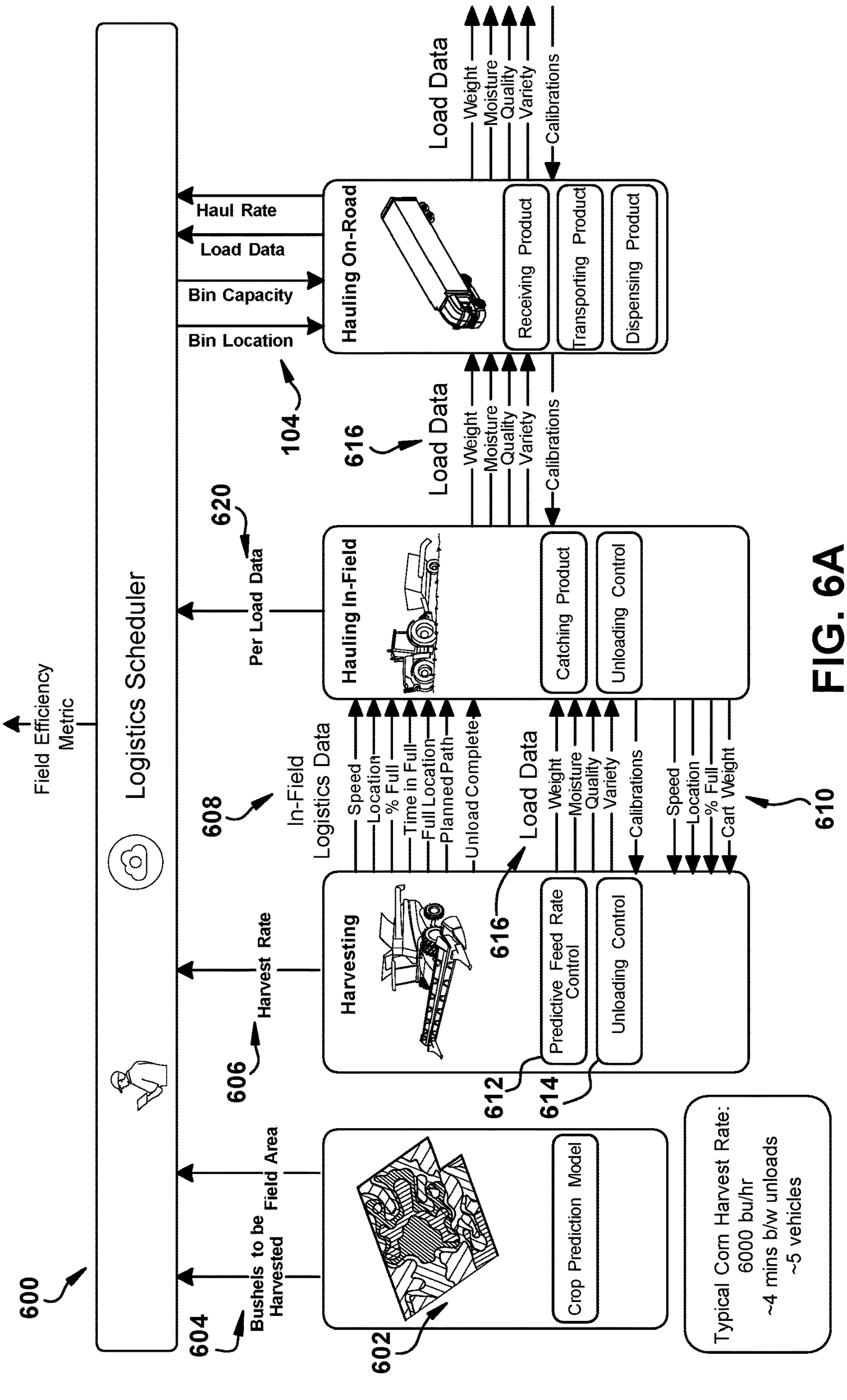
FIGS. 6A and 6B are schematic diagrams illustrating example implementations of one or more portions of systems and methods as described herein.
Figure 6B:
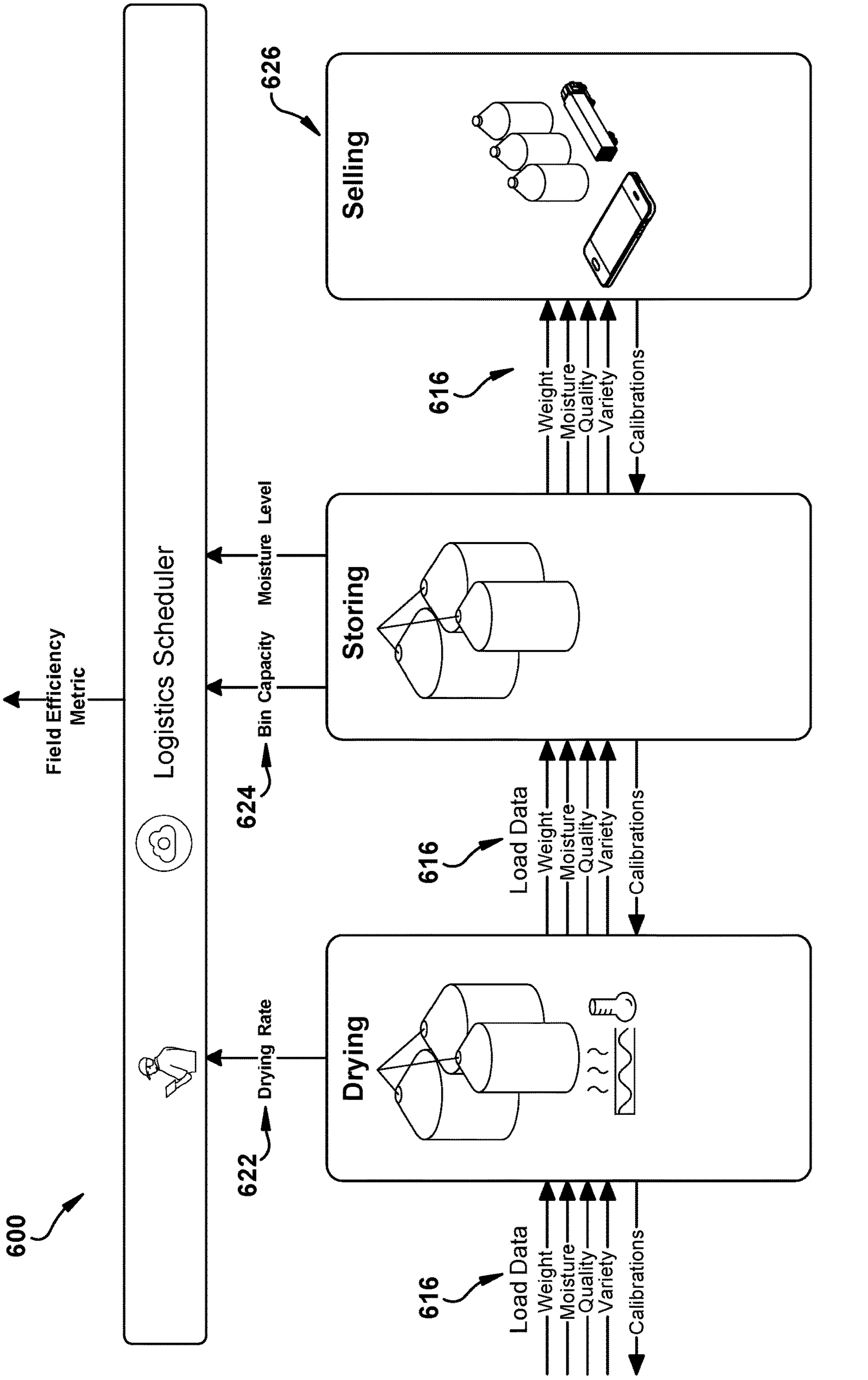

As illustrated, in FIGS. 6A and 6B, a crop prediction model 602 can be used to identify crop prediction data 604, such as the amount to be harvested and field area, which is loaded to the logistics scheduler 600. During harvesting, the prediction model 602 may be used to identify harvesting data 606, such as harvesting rate, and in-field logistics data 608, such as speed, location, % full, predicted time to full, predicted full location, and predictive/planned path. Further, in some implementations, the prediction model 602 may be used to identify target (e.g., an "optimized") fleet type and size for a given site, for example, based at least on situational constraints, such as available equipment and labor, environmental constraints, access points, etc. In this implementation, for example, the prediction model 602 may utilize data input that is indicative of situational logistics and constraints, and output a target fleet size and type (e.g., number and types of equipment) that optimizes harvesting, offloading, loading and transport of product from the field.

The hauling in the field undertaken by field carts/tractors can provide cart data 610, such as speed, location, % full, and cart weight. During offloading, the predictive feed rate control 612 and a predictive feed rate 614 can be used to identify and control load data 616, such as weight, moisture, quality, and variety. Similarly, when the cart transports the collected product to the trailer for on-road hauling, the load data 616 follows the product, and can be used to identify load characteristics from each cart loading to the trailer. The cart load data 620 can be loaded to the logistics scheduler 600 to be aggregated and associated with the trailer load. Hauling data 622 from/to the logistics scheduler 600 can include the bin capacity and bin location for the storage location to which the trailer is heading, and load data and hauling rate for the trailer.

In FIG. 6B, the harvested product can be transported to a drying facility, and drying data 622, such as trying time/rate, can be loaded to the scheduler 600. In this example, the load data 616 continues to follow the product and is used to identify the product as aggregated or segregated with/from other collected products. Further, the product can be sent to a storing facility, where the load data 616 continues to follow the product for identification purposes. Storage data 624 can be loaded to the logistics scheduler 600, including storage bin capacity (e.g., used by the haulers) and moisture level of the product (e.g., as aggregated). The load data 616 continues to follow the product to the point of sale 626, to help identify the desired characteristics of the product. Further, at the point of sale, the characteristics of the product can be determined, and any differences between the collected data and the data identified at the point of sale can be used for calibration of the data collection points and equipment, such as all the way back to the harvester.

Figure 7A:
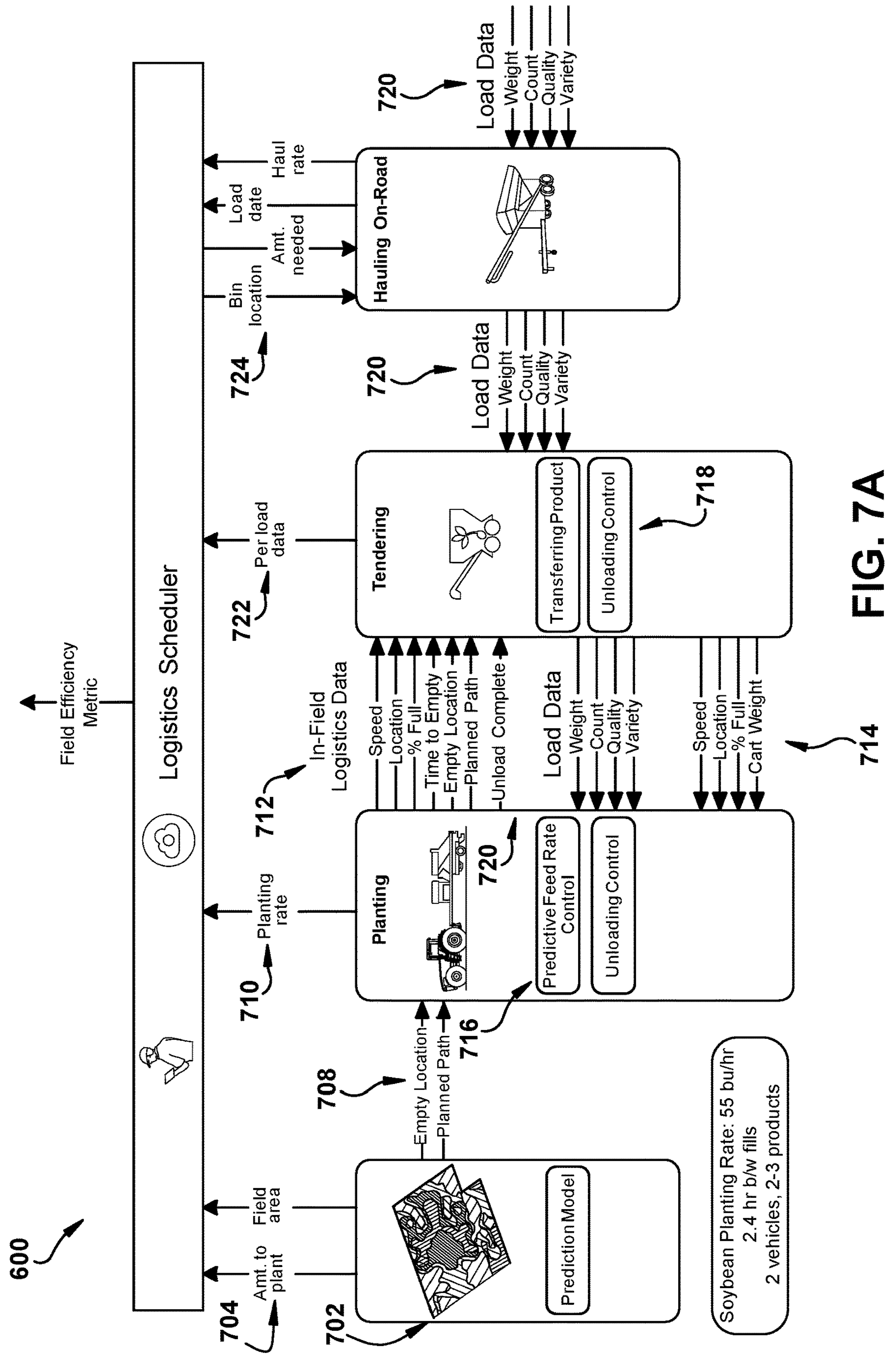
FIGS. 7A and 7B are schematic diagrams illustrating example implementations of one or more portions of systems and methods as described herein.
Figure 7B:
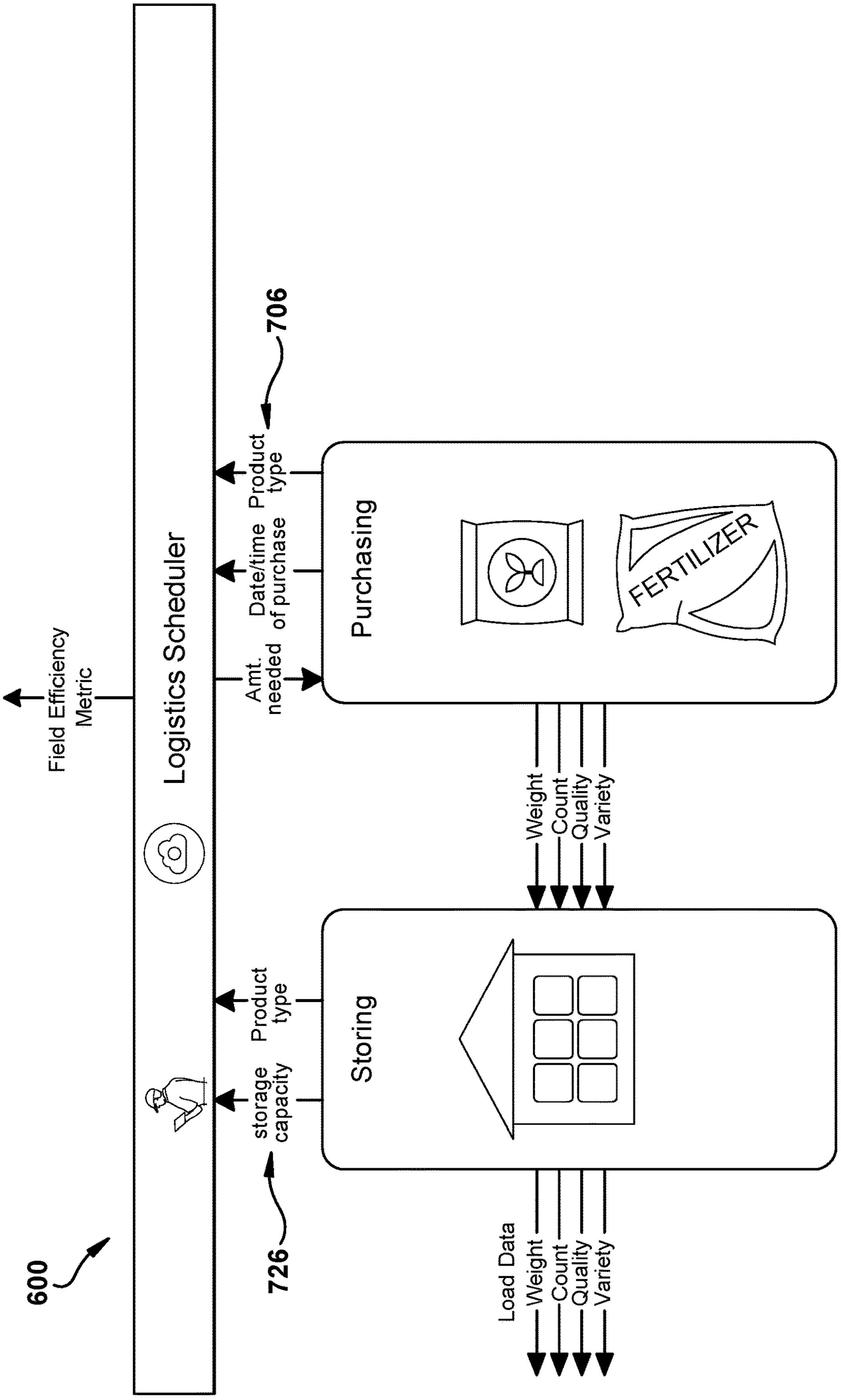

Similarly, as illustrated in FIGS. 7A and 7B, the logistics scheduler 600 can be used for product dispersal into the field(s), such as for planting, chemical application, etc. A prediction model 702 can be used to identify planting data 704, such as a field area and amount of product needed to plant. In FIG. 7B, purchase data 706 can be provided, such the amount needed, and the date/time and product type purchased can be loaded to the logistics scheduler 600. In FIG. 7A, during planting, the planting location data 708, such as the target field location, and planned planting path can be provided by the predictive model 702; and a planting rate 710 can be loaded to the logistics scheduler 600. As with the harvesting, the in-field logistics 712 can be provided for the product tendering, and the tendering logistics data 714 so that the planter and tender can meet up in the field appropriately during the planting operation. During the loading of product from the tender to the planter, a predictive feed rate control 716 and unloading control 718 can be used to identify when to begin and end loading. In this example, load data 720 can follow the product in reverse from the point of purchase to the planting operation.

Additionally, the tender load data 722 can identify characteristics of each load tendered, and the on-road hauling data 724, such as location of collection bin, amount needed for planting, can be identified. As before, the per load data and haul rate can also be identified and loaded to the logistics scheduler 600. In FIG. 7B, the storage data 726 can included storage capacity and product type, for the purchased product placed in storage. In this way, as illustrated, the amount of product need for the target planting operation can be identified, such as by a predictive planting program, and the remaining data can be automatically generated by the logistics scheduler system 600. That is, for example, the product can automatically be purchased in the correct amount and type needed, the product can be appropriately stored at least until planting begins, the product can be hauled to the field at the appropriate time, and automatically tendered to the planter that is operating in the field.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method for automatic load tracking and logistics for agricultural-related products, comprising:

during operation of an agricultural vehicle, collecting real-time data indicative of:

a location of the agricultural vehicle over time; and an amount of product disposed in a storage container in the agricultural vehicle over time; and a measured product attribute of the product in the storage container of the agricultural vehicle, including two or more of:

moisture content;

quality of the product;

protein amount;

oil content; and product damage;

upon automatic determination that the amount of product disposed in the vehicle storage container has reached a first predetermined level:

activating an alert that indicates deployment of a mobile product transport container to the agricultural vehicle;

upon automatic detection of the mobile product transport container reaching a product loading position with regard to the agricultural vehicle, activating a loading signal indicative of initiation of a loading procedure between the agricultural vehicle and the mobile product transport container, wherein the activating the loading signal indicative of initiation of the loading procedure automatically comprises one of: automatically activating the loading procedure between the agricultural vehicle and the mobile product transport container; and activating an alert for an operator to initiate the loading procedure between the agricultural vehicle and the mobile product transport container; and upon automatic detection of the amount of product disposed in a storage container reaching a second predetermined level, activating a loading deactivation signal indicative of deactivating of the loading procedure between the agricultural vehicle and the mobile product transport container; and aggregating the collected attribute of the product on aper-mobile-product-transport-container basis, the aggregating comprising associating the collected data indicative of the measured product attribute that is collected during a time window beginning upon the activating of the loading signal and ending upon the activating of the loading deactivation signal with the specific mobile product transport container detected at the product loading position using the collected data indicative of the measured product attribute.

2. The method of claim 1, wherein the first predetermined level is a high level of product filled into the storage container of the agricultural vehicle during product collection that is indicative of an initiation of an offloading procedure, wherein the initiation of the offloading procedure provides sufficient time for the product to be offloaded to the mobile product transport container while product collection continues.

3. The method of claim 2, wherein the first predetermined level is indicated by a determined product collection rate that is based at least on the amount of product disposed in the storage container over time.

4. The method of claim 1, wherein the first predetermined level is determined by an operator of the agricultural vehicle during harvesting of the product.

5. The method of claim 1, wherein the second predetermined level is a low level of product in the storage container of the agricultural vehicle indicative of a substantially empty container.

6. The method of claim 1, wherein the first predetermined level is a low level of product being dispensed from the storage container of the agricultural vehicle during dispensing that is indicative of the initiation of the loading procedure, wherein the initiation of the loading procedure provides sufficient time for the product to be onloaded from the mobile product transport container while product dispensing continues.

7. The method of claim 1, wherein the second predetermined level is a high level of product in the storage container of the agricultural vehicle indicative of a substantially full container.

8. The method of claim 1, the collecting of real-time data occurring on a remote-based computing system coupled with the agricultural vehicle by a wireless network.

9. The method claim 8, the activating of the alert performed by the remote-based computing system, and transmitted to an operator of the mobile product transport container using the wireless network.

10. The method of claim 1, comprising automatically detecting that the mobile product transport container has reached the product loading position using one or more of:

a proximity beacon disposed on the mobile product transport container;

a camera disposed on the agricultural vehicle;

a scanner disposed on the agricultural vehicle; and vehicle position data provided for the mobile product transport container.

11. The method of claim 1, comprising, during the operation of the agricultural vehicle, collecting real-time data indicative of a condition of the product in the storage container of the agricultural vehicle, including one or more of:

a product type;

a ratio of product to other-than-product; and a location of collection.

12. The method of claim 8, comprising collecting of real-time data indicative of a condition of the product using the remote-based computing system coupled with the agricultural vehicle by the wireless network.

13. The method of claim 12, comprising aggregating the collected product using the collected data indicative of the condition of the product.

14. The method of claim 1, comprising detecting a state of a product transfer device, and generating transfer state data indicative of the state of the product transfer device.

15. The method of claim 11, the collected real-time data indicative of the condition of the product automatically associated with the mobile product transport container upon initiation of the loading procedure.

16. The method of claim 1, the loading procedure between the agricultural vehicle and the mobile product transport container comprising one of:

an offloading of the product from the agricultural vehicle to the mobile product transport container; or a loading of the product from the mobile product transport container to the agricultural vehicle.

17. A system for automatic load tracking and logistics, comprising:

a data collection module comprising at least one processor and a memory storing instructions that, when executed by the at least one processor, cause the data collection module to, which, during operation of an agricultural vehicle, collects real-time data indicative of:

a location of the agricultural vehicle over time; and an amount of product disposed in a storage container in the agricultural vehicle over time; and a measured product attribute of the product in the storage container of the agricultural vehicle, including two or more of:

moisture content;

quality of the product;

protein amount;

oil content; and product damage;

a product storage level monitoring component, comprising a sensor that detects a level of product disposed in the storage container of the agricultural vehicle, wherein, upon the sensor detecting that the amount of product disposed in the storage container has reached a first predetermined level, the product storage level monitoring component:

activates an alert that indicates deployment of a mobile product transport container to the agricultural vehicle;

upon automatic detection of the mobile product transport container reaching a product loading position with regard to the agricultural vehicle, automatically activates a loading procedure between the agricultural vehicle and the mobile product transport container; and upon automatic detection of the amount of product disposed in a storage container reaching a second predetermined level, automatically deactivates the loading procedure between the agricultural vehicle and the mobile product transport container; and a data aggregation component comprising at least one processor and a memory storing instructions that, when executed by the at least one processor, cause the data aggregation component to aggregate the collected measured product attribute of the product on a per-mobile-product-transport-container basis, by associating the collected data indicative of the measured product attribute that is collected during a time window beginning upon automatic activation of the loading procedure and ending upon automatic deactivation of the loading procedure with the specific mobile product transport container detected at the product loading position.

18. The system of claim 17, the data collection module comprising a remote-based computing device, communicatively coupled with the agricultural vehicle by a wireless network, and the data collection module:

receiving vehicle position data from the agricultural vehicle and determining a vehicle speed and vehicle heading based on the received vehicle position data over time; and receiving sensor data indicative of an amount of product being deposited into or removed from the storage container and determining a rate of collection or rate of deposition based on the received sensor data over time.

19. The system of claim 18, the data collection module further determining the first predetermined level based at least on the rate of collection or rate of deposition, the vehicle speed, and the vehicle heading.

20. The system of claim 18, the data collection module further collecting real-time data indicative of a condition of the product in the storage container of the agricultural vehicle, including one or more of:

a product type;

a ratio of product to other-than-product; and a location of collection.

21. The system of claim 17, the product storage level monitoring component comprising a local computing device comprising memory storing programming and a processor to execute the programming, the product storage level monitoring component:

receiving the first predetermined level from a remote-based computing device using a wireless network; and upon receipt of data from the indicative of the product reaching the first predetermined level, transmitting a level reached signal to the remote-based computing device resulting in the activation of the alert that indicates deployment of the mobile product transport container.

22. A system for automatic load tracking and logistics, comprising:

a vehicle locator comprising a location sensor that is communicatively coupled with a computing device having memory that stores instructions and a processor to process instructions and received data, the vehicle locator identifying a vehicle's location, speed, and heading, based at least on location data received over time from the location sensor;

a product detector comprising a first sensor array that operably detects an amount of a target product in a storage container on the vehicle, and detects characteristics of the target product comprising two or more of: moisture content; quality of the product; protein amount; oil content; and product damage, the first sensor array communicatively coupled with the computing device to determine a rate of change of the target product in the vehicle storage container, and product characteristics of the product;

a product loading detector comprising a second sensor array that operably performs one or more of:

identifies a vehicle product loading location for a secondary product storage implement to load to or offload from the vehicle; and detects an amount of product loaded to or offloaded from the vehicle to determine when to end loading; and a remote-based logistics component comprising a computing device that includes memory and a processor, the logistics component operably transmitting an alert to an operator of the secondary product storage implement that is indicative of an initiation of a product loading or offloading procedure, and the logistics component collecting and aggregating data indicative of the characteristics of the product on a per-secondary product storage implement basis, the aggregating comprising associating collected data of a measured product attribute indicative of the characteristics of the target product that is collected during a time window beginning upon activating of a loading signal and ending upon the activating of a loading deactivation signal with the specific secondary product storage implement detected at the vehicle product loading location using the collected data indicative of the measured product attribute, and the loading time and location.

* * * * *